July 17, 1951   J. W. BISHOP   2,560,841
HYDRAULIC VALVE
Filed Dec. 20, 1946
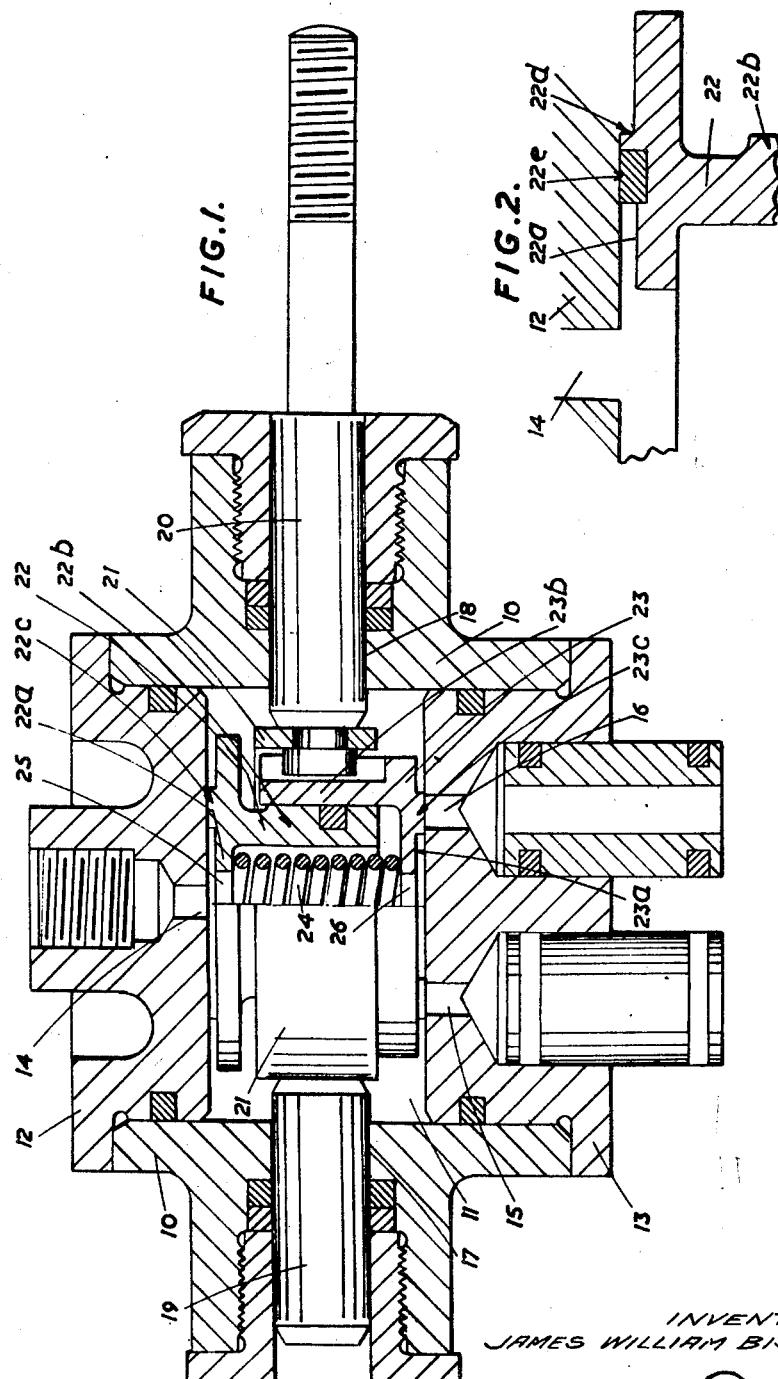
INVENTOR
JAMES WILLIAM BISHOP
BY Robert B. Larson
ATTORNEY Patented July 17, 1951

2,560,841

UNITED STATES PATENT OFFICE 2,560,841

HYDRAULIC VALVE

James William Bishop, Hayes, England, assignor to The Fairey Aviation Company Limited, Hayes, England Application December 20, 1946, Serial No. 717,485
In Great Britain January 24, 1946

6 Claims. (Cl. 251—73)

This invention relates to hydraulic valves of the kind having relatively movable parts with faces in slidable contact and exposed to pressure. It is an object of the invention to provide a valve which will utilize the pressure to effect and maintain a seal, so that the higher the pressure the more effective will be the seal.

At the same time, it is advantageous with such valves that the operating load, that is, the force required to move the operative faces while the seal is being effected, should be minimized, and it is a further object of the present invention to provide a construction which will assist to this end, without any reduction in the efficacy of the seal.

In accordance with the invention a hydraulic slide valve comprises a valve body having two oppositely disposed interior faces, through one of which passes an inlet port and through the other of which pass at least two outlet ports, and between said faces a slide comprising two main parts, the parts of which are telescopic and so formed that the inlet pressure forces them apart and against the oppositely disposed interior faces of the valve body to effect a seal.

The operative faces of the parts of the two-part slide may be formed with annular lands, the land on one of said parts surrounding the inlet port and permitting it to communicate only with the interior of the slide and any outlet therefrom, and the land on the other part surrounding an outlet through said part and serving to seal the outlet ports when the valve is in the neutral position.

The outer of the two telescopic parts of the slide may be surrounded by a ring to which are attached at diametrically opposite points an operating rod and a balance rod slidable in bearings in the valve body.

At least one of each pair of co-operating surfaces constituting a seal may be formed with an insert of relatively soft metal exposed to the high pressure fluid, said insert being surrounded, within the area of the seal, by the relatively harder metal of which the valve body and slide are formed.

An insert may be provided in each of the parts of a two-part slide, the land of each part being annular, and the inner portion of the annulus being recessed and filled with soft metal such as solder to the same level as the outer portion of the land, which forms a wall around the outside of the recess.

Two forms of the invention will be described with reference to the accompanying drawings, in which:

Figure 1 is a sectional elevation of one form of valve, and

Figure 2 is a fragmentary sectional view, on an enlarged scale, of another form of two-part slide.

Referring to Figure 1 of the drawings, a valve body 10 has an interior cylindrical chamber 11, the top and bottom walls consisting of plugs 12, 13, the inner surfaces of which constitute the faces against which seals are to be effected. The upper plug 12 is apertured centrally to form an inlet port 14, and the lower plug 13 is apertured in two places on a centre line of the valve body and at equal distances from its centre, to form two outlet ports 15, 16. At two diametrically opposite positions on the cylindrical wall are formed bearings 17, 18 for two rods 19, 20 which are permitted axial travel in the same plane as the centre line on which the outlet ports 15, 16 are disposed. These rods constitute an operating rod 20 and a balance rod 19 respectively for a slide in the interior chamber 11, of the valve body 10, and for this purpose their inner ends pass through, and are secured to, a ring 21 lying in the interior chamber 11.

Within the ring 21 and surrounded by, but not secured to, it is a slide, having two parts, an upper part 22 and a lower part 23. Each of the parts 22, 23 comprises a circular disc 22$^a$, 23$^a$, lying parallel with, and close to, the respective face of the chamber 11, and the part 23 has an upstanding, and the part 22 a depending, cylindrical flange near its periphery. The depending flange 22$^b$ on the upper part 22 lies within the upstanding flange 23$^b$ on the lower part 23, in telescopic relationship, and a compression spring 24 inside the slide and bearing on the discs 22$^a$, 23$^a$ serves to hold them apart. The discs 22$^a$, 23$^a$ are apertured centrally as at 25, 26, and, on the sides adjacent to the plugs 12, 13, are formed with annular lands 22$^c$, 23$^c$.

The land 22$^c$ on the upper part 22 surrounds the inlet port 14, and its distance from the inlet port (i. e. the internal radius of the annular land 22$^c$ less the radius of the inlet port 14) is equal to the axial travel of the operating rod 20. Thus, whatever the position of the valve, the inlet port 14 is denied access to the interior chamber of the valve body except that part enclosed by the parts 22, 23 of the slide and their lands 22$^c$, 23$^c$. The horizontal surfaces of the upper part 22 on which hydraulic pressure can act upwardly are arranged to be greater in area, by an amount termed the "effective area," than the horizontal surface on which hydraulic pressure can act downwardly (that portion of the upper surface of the disc 22ᵃ lying within the land 22ᶜ). Similarly, with the lower part 23, the horizontal surface on which hydraulic pressure can act downwardly (i. e. the top surface of the disc 23ᵃ lying within the upstanding flange 23ᵇ) is arranged to be greater in area, by an amount termed the "effective area," than the horizontal surface on which hydraulic pressure can act upwardly (i. e. the under surface of the disc 23ᵃ within the annular land 23ᶜ).

Before hydraulic pressure is admitted through the inlet port 14 the spring 24 serves to hold the parts 22, 23 of the slide against the plugs 12, 13 of the valve chamber, but when such pressure is admitted the parts 22, 23 of the slide are subjected to resultant pressure acting upwardly and downwardly respectively on the effective areas of the upper and lower parts, and in consequence said parts are forced apart against the faces of the plugs 12, 13 by a force proportional to the inlet pressure, thus effecting a seal.

On movement of the operating rod 20 axially in either direction, one of the outlet ports 15, 16 is uncovered by the land 23ᶜ on the lower part 23 and thereby put in communication with the interior of the slide and with the inlet port 14. Pressure on the parts 22, 23 of the slide is still maintained, however, and a seal is effected irrespective of the position of the slide.

Referring to Figure 2, the land (22ᶜ in Figure 1), instead of being wholly of the same material as and integral with the part 22, is formed in two portions, an outer wall 22ᵈ and an insert 22ᵉ. The insert 22ᵉ is of relatively soft metal such as solder, and, together with the wall 22ᵈ, constitutes a land equal in dimensions to the previously described land 22ᶜ.

When the valve is opened to high pressure fluid, the part 22 of the slide is forced towards the adjacent interior face of the plug 12, but the annulus 22ᵉ yields slightly, allowing a thin film of fluid to penetrate outwards between it and the face of the plug 12 as far out as the soft metal extends, the outer portion 22ᵈ of the land, being of harder metal, preventing further penetration. The presence of the film of fluid restricts flow across the valve land and prevents seepage. A similar land is provided for the lower part of the slide.

A valve arranged in accordance with this invention is particularly adapted for use in cases where a minimum amount of lost motion, fluid leakage, and operating load are desirable, as for example in powered, or power-assisted, aircraft flying controls.

I claim:

1. A hydraulic slide valve comprising a valve body having two oppositely disposed interior faces, one of said faces being formed with an inlet port and the other of said faces being formed with at least two outlet ports, a slide having two parts located between said faces, said parts being hollow and having cooperating portions telescoping in a direction normal to said faces and defining an interior chamber, means for admitting hydraulic pressure into said chamber from said inlet port, said parts having differential hydraulic pressure surfaces exposed to the hydraulic pressure from said inlet, said surfaces being positioned and arranged to urge said parts away from one another against said faces, and operating means accessible from the exterior of said valve body and arranged to move said slide parallel with said faces to and from positions in each of which at least one of said ports is closed, the operative faces of said parts being formed with annular lands, the land on one of said parts surrounding said inlet port and permitting it to communicate only with the interior of said slide and an outlet therefrom, and the land on the other of said parts surrounding an outlet through said part and so located as to be capable, in one position of said slide, of closing the outlet ports.

2. A hydraulic slide valve as claimed in claim 1, wherein the lands are formed with inserts of relatively soft metal, said inserts being surrounded by the relatively harder metal of which the lands are formed.

3. A hydraulic slide valve comprising a valve body having two oppositely disposed interior faces, one of said faces being formed with an inlet port and other of said faces being formed with at least two outlet ports, a slide having two parts located between said faces, said parts being hollow and having cooperating portions telescoping in a direction normal to said faces and defining an interior chamber, means in the first of said parts for admitting hydraulic fluid into said chamber from said inlet port, means in the second of said parts for the passage of fluid from said chamber to whichever of said outlet ports is uncovered, said parts having differential hydraulic pressure surfaces exposed to the hydraulic pressure from said inlet, said surfaces being positioned and arranged to urge said parts away from one another against said faces, said second part having exterior surface portions cooperating with said outlet ports and movable with said slide to positions in which, selectively, passage of fluid from said chamber to one or the other or both of said outlet ports is blocked, and operating means accessible from the exterior of the valve body and arranged to move said slide parallel with said faces between said positions.

4. A hydraulic slide valve for a pressure fluid comprising a valve body formed with pressure and exhaust connections and a hollow interior having two oppositely disposed interior faces, the first of said faces being formed with an inlet port and the second of said faces being formed with at least two outlet ports, a slide arranged to be movable along said faces and within the hollow interior of the valve body in a plane parallel with said faces and having two cup-shaped parts located between said faces, said parts being arranged in addition to slide telescopically one within the other in a direction normal to said faces and constituting a hollow chamber having oppositely disposed slide inlet and slide outlet openings capable of communicating simultaneously with said inlet port and either of said outlet ports respectively, the slide inlet opening being at all times in communication with said inlet port, the operative face of the part movable along said second face having surface portions cooperating with said outlet ports and movable with said slide to positions in which, selectively, passage of fluid from said chamber through said slide outlet opening to one or the other of said outlet ports is blocked, said parts being formed with areas within said hollow chamber exposed to said pressure fluid and said parts also being formed with areas within said hollow interior exposed to the pressure fluid in said interior whereby said pressure fluids in the hollow chamber and in the hollow interior force the parts away from one another and against said oppositely disposed interior faces, and operating means accessible from the exterior of said valve body and arranged to move said slide parallel with said faces between said positions in each of which fluid flow from said hollow chamber to only one of said outlet ports is permitted.

5. A hydraulic slide valve for a pressure fluid as claimed in claim 4, the operative faces of said parts being formed with annular lands, the land on one of said parts surrounding said inlet port and permitting it to communicate only with the interior of said slide and an outlet therefrom, and the land on the other of said parts comprising said surface portions and being so located surrounding said slide outlet opening as to be capable, in one position of said slide, of closing both outlet ports.

6. A hydraulic valve according to claim 1, wherein said parts have differential hydraulic pressure surfaces exposed to said hydraulic pressure and positioned so as to cause said movement of the parts away from each other when acted upon by said hydraulic pressure, said operating means including a ring embracing said slide and an operating rod and guide rod attached to said ring at diametrically opposite points and slidable in said valve body.

JAMES WILLIAM BISHOP.

REFERENCES CITED

The following references are of record in the file of this patent:

UNITED STATES PATENTS

| Number | Name | Date |
| --- | --- | --- |
| 708,990 | Bickford | Sept. 16, 1902 |
| 709,491 | Kennedy | Sept. 23, 1902 |
| 1,586,345 | Wilson | May 25, 1926 |
| 2,091,618 | Szabo | Aug. 31, 1937 |
| 2,151,596 | Halle | Mar. 21, 1939 |
| 2,252,141 | Seidel | Aug. 12, 1941 |

FOREIGN PATENTS

| Number | Country | Date |
| --- | --- | --- |
| 4,947 | Great Britain | of 1893 |
| 71,989 | Sweden | June 9, 1931 |
| 213,803 | Germany | Sept. 30, 1909 |
| 485,210 | France | Sept. 28, 1917 |